Jan. 27, 1970   D. L. CAMPBELL   3,492,575
PEAK READING VOLTMETER WITH ACCELERATED RESPONSE
Filed July 13, 1967
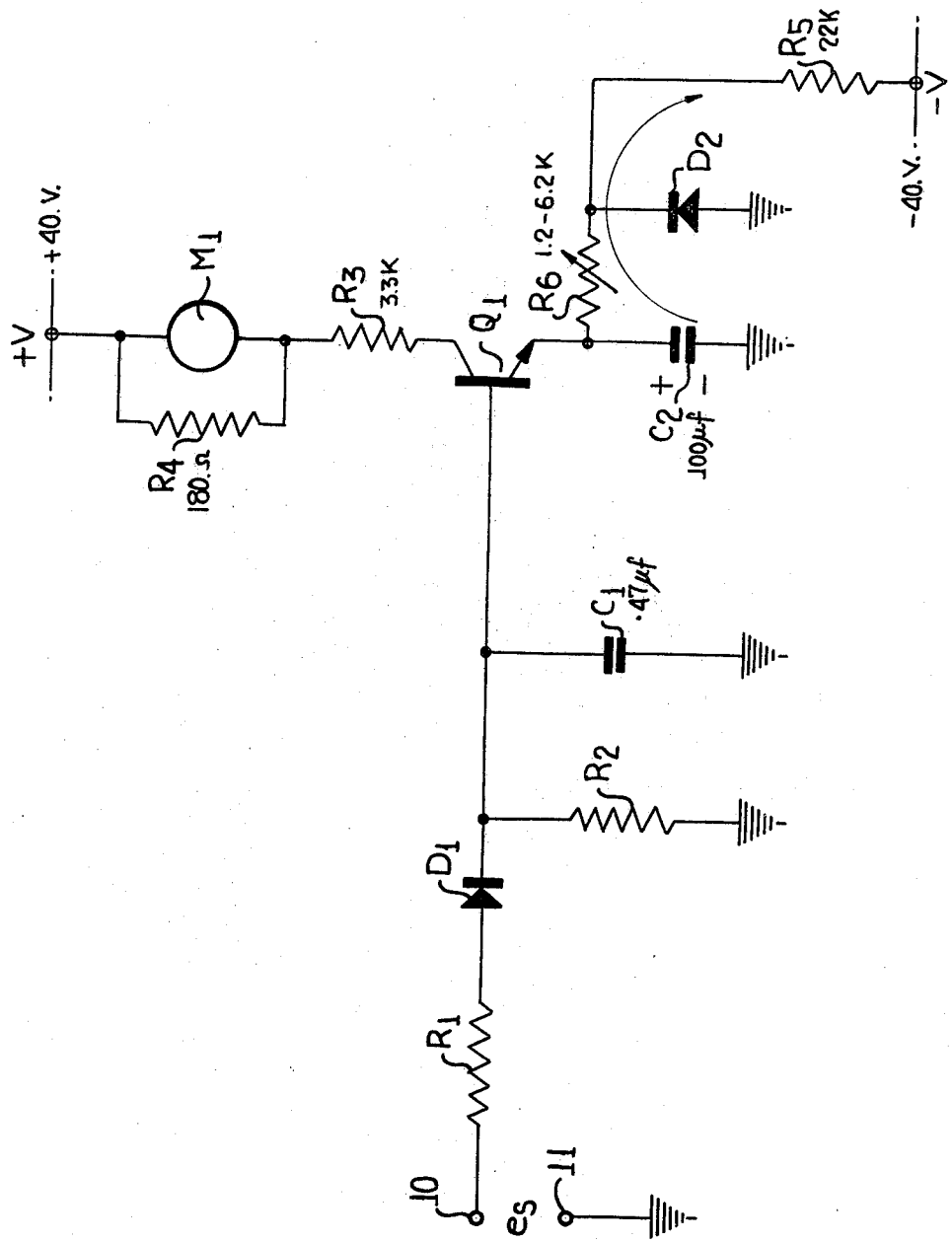
INVENTOR
DAVID L. CAMPBELL
BY Hurvitz, Rose & Greene
ATTORNEYS 3,492,575
PEAK READING VOLTMETER WITH
ACCELERATED RESPONSE
David L. Campbell, Santa Clara, Calif., assignor to
McIntosh Laboratory, Inc., Binghamton, N.Y.
Filed July 13, 1967, Ser. No. 662,240
(Filed under Rule 47(b) and 35 U.S.C. 118)
Int. Cl. G01r 19/16, 1/00, 1/14
U.S. Cl. 324—103                                9 Claims

ABSTRACT OF THE DISCLOSURE

A peak voltage detector responsive to a wide band AC signal, provides control for an NPN transistor. A meter and a current limiting resistance are connected in series in the collector circuit of the transistor. A large capacitor is connected between the emitter electrode and ground, and a large resistance between the emitter and a negative voltage source. The cathode of a diode is connected to a point of this resistance, and normally provides −.6 v. bias for the emitter, by suitable selection of the negative voltage and the resistance in intervening between it and the cathode of the diode.

On initial application of voltage to the base of the transistor meter current flows through the meter, the current limiting resistance, the collector-emitter circuit and into the capacitor, which is initially an effective short circuit. This current decreases as the capacitor charges, but is initially ten times that required for full scale deflection. On attaining steady state current flows from the positive to the negative terminal, and the total resistance in circuit is selected to provide full scale deflection for a predetermined maximum peak signal.

BACKGROUND OF THE INVENTION

The present invention relates to peak reading voltmeters and particularly to a circuit for improving the response time of such meters.

Peak reading instruments having an amplifier to isolate a meter from a diode detector circuit are generally known in the prior art. An example of such an instrument is disclosed in U.S. Patent No. 2,162,239 to Beuermann. However, the Beuermann circuit does not provide for accelerated displacement of a meter pointer in response to changes of input signal level.

It is known to improve the response of a DC meter by directing the initial meter current into a capacitor, which presents an initial effective short circuit to transient increase of current and thus transiently provides high current flow to the meter. Such an approach is disclosed in U.S. Patent No. 2,356,617 to Rich.

SUMMARY OF THE INVENTION

A peak reading voltmeter in which peak voltages are applied to the base of a transistor, in which current flow transiently occurs through a meter movement, the transistor and a storage capacitor, so that initial high current surges occur when peak voltage increases and the meter movement is driven up in a ballistic mode, and wherein the storage capacitor discharges toward a negative voltage in a long time constant circuit, until a clamping voltage of −.6 v. is reached, the latter limit being established by a clamping diode.

BRIEF DESCRIPTION OF THE DRAWINGS

The single figure of the drawings is a schematic circuit diagram of a peak reading voltmeter circuit according to the present invention.

DESCRIPTION OF THE PREFERRED EMBODIMENTS

Referring now specifically to the single figure of the drawings, there is illustrated a pair of input terminals 10 and 11. Terminal 11 is connected to ground or other suitable reference potentials, and terminal 10 to a wide band audio source. A resistance $R_1$ and diode $D_1$ are connected in series with one another and with terminal 10, diode $D_1$ being poled to conduct only positive going signals applied between terminals 10 and 11. A resistor $R_2$ and a capacitor $C_1$ are connected in parallel between the cathode of diode $D_1$ and ground. The cathode of diode $D_1$ is further connected to the base of an NPN transistor $Q_1$. The emitter of transistor $Q_1$ is coupled to ground through capacitor $C_2$. Also connected to the emitter of transistor $Q_1$ is one end of a resistor $R_6$, the other end of which is connected to the cathode of a diode $D_2$. The cathode of diode $D_2$ is also connected to a resistor $R_5$ which is further coupled to a source of negative voltage −v. (−40 v.). The anode of diode $D_2$ is connected to ground. The collector electrode of transistor $Q_1$ is connected to a positive voltage source +v. (+40 v.) through a current limiting resistor $R_3$ and the parallel combination of damping resistor $R_4$ (180Ω) and meter $M_1$.

In operation, a broad-band audio signal source $e_s$ is connected between terminals 10 and 11. It is assumed that the signal is susceptible to rapid variations in peak voltage, particularly to transient voltage peaks which may be many decibels higher than the average voltage level. As such peaks may overdrive an audio amplifier, the present meter is designed to monitor their presence to indicate the desirability of turning down amplifier gain. The input resistor $R_1$ is of relatively low resistance; hence, the input signal peaks charge capacitor $C_1$ relatively quickly. Resistance $R_1$ also limits current input to the base of $Q_1$ to a safe value. When the input signal level falls below the voltage level to which capacitor $C_1$ is charged, diode $D_1$ prevents discharge of capacitor $C_1$ through the source $e_s$. Resistance $R_2$ is made relatively large so that the time constant of $R_2$ and $C_1$ in combination is sufficiently high to store the voltage peaks for a considerable length of time. If the leakage resistance of diode $D_1$ is of sufficient value to provide the desired storage time constant with capacitor $C_1$, resistor $R_2$ may be dispensed with. The emitter of transistor $Q_1$ is biased slightly negative. This emitter bias is achieved by means of voltage source −$v_1$ which biases diode $D_2$ into conduction through resistor $R_5$. The small voltage drop across the diode $D_2$ in its conducting mode, which, for example, may be −.6 v., is coupled to the emitter elecrode by resistor $R_6$. When transistor $Q_1$ is cutoff, no current flows through meter $M_1$, and the latter provides a zero indication. When an input signal is received at terminals 10 and 11 and the peak voltage is stored in capacitor $C_1$, transistor $Q_1$ is biased conductive. A current path is thus provided from voltage source +v. to ground via meter $M_1$, resistor $R_3$, the collector-emitter circuit of transistor $Q_1$ and the capacitor $C_2$. A very heavy current flows initially, limited essentially only by $R_3$, and delivers a ballistic impulse to the meter $M_1$. This initial current is determined primarily by the resistance of resistor $R_3$ since the initial effective impedance of capacitor $C_1$ and of the impedance of transistor $Q_1$ are negligible, in comparison. Meter $M_1$, of course, has a low impedance. By appropriate choice of $R_3$, the initial current surge through meter $M_1$ may be equivalent to that which would produce ten times full scale deflection if applied in a steady state condition. Capacitor $C_2$ begins charging upon receipt of this current surge, with a time constant which is essentially determined by $R_3$, $C_2$, although there is a slight current bleed off occurring via resistances $R_6$ and $R_5$ and an increasing resistance effect produced by the collector-emitter circuit of transistor $Q_1$ as the latter begins to conduct less heavily. The reduction in conduction of transistor $Q_1$, results because the emitter electrode becomes more positive as capacitor $C_2$ charges, thereby reducing the voltage drop across the base to emitter junction. After capacitor $C_2$ has charged to the level determined by the input signal, and steady state conditions obtain, a D-C current path is provided from positive voltage source $+v$. via meter $M_1$, resistor $R_3$, the collector emitter circuit of transistor $Q_1$, resistor $R_6$, resistor $R_5$ and the negative voltage source $-v$. The current in this path remains constant for a constant base voltage at transistor $Q_1$, and hence the current through meter $M_1$ and the meter reading remains steady.

Any increase of the voltage from source $e_s$ above that stored in capacitor $C_1$ results in a transient increase in the voltage at base $Q_1$. This is reflected across the base to emitter junction of transistor $Q_1$ and increases conduction of transistor $Q_1$. Once again the current through meter $M_1$ surges and then levels off as the capacitor $C_2$ charges.

Upon decrease of the voltage across capacitor $C_1$ and hence at the base of transistor $Q_1$ the conductivity of transistor $Q_1$ is diminished and the charge for capacitor $C_2$ is not adequately replenished. Capacitor $C_2$ thus discharges slowly through resistors $R_6$ and $R_5$ towards the negative voltage supply $-v$., essentially, according to the time constant $C_2(R_6+R_5)$. The meter reading is thus maintained for a relatively long time interval by the action of capacitor $C_1$, which holds its peak voltage level for a relatively long time due to the large time constant provided by $R_2C_1$, and by the slow discharge of capacitor $C_2$.

Meter $M_1$ does not overshoot because capacitor $C_2$ charges exponentially as the meter pointer moves upscale, thereby causing a progressive decrease in the meter current until a steady state reading has been achieved, and this occurs soon enough to prevent overshoot. The steady state, of course, is representative of the peak signal as applied to the base of the transistor. Resistor $R_4$ also damps the meter displacement, in a manner well known per se. Nevertheless, because of the initial upscale current surge of about ten times full scale current, the meter pointer is translated upscale very rapidly on occurrence of a peak.

Resistor $R_6$ is adjustable to determine the sensitivity of meter $M_1$. More particularly, the value of $R_6$ can be chosen to provide a full scale reading at meter $M_1$ when a steady DC current flows in the meter circuit between the positive voltage source $+v$. and the negative voltage source $-v$., at some predetermined base voltage.

While I have described and illustrated one embodiment of my invention, it will be clear that variations of the details of construction which are specifically illustrated and described may be resorted to without departing from the true spirit and scope of the invention as defined in the appended claims.

What is claimed is:

1. A peak voltmeter responsive to wide band AC signals having variable peaks occurring at random intervals, comprising means for developing and storing over said intervals a peak DC voltage in response to said AC signals, a unidirectional amplifying device having a control terminal, a supply terminal and an output terminal, means for applying said stored peak DC voltage to said control terminal, a storage capacitor, means connecting said storage capacitor between said output terminal and ground, a meter, a current limiting resistance, a source of supply voltage, means connecting said meter and current limiting resistance between said source of supply voltage and said supply terminal, and a resistive discharge circuit for said capacitor providing a DC path for said amplifying device, said resistive discharge circuit and said capacitor having a time constant of the order of said intervals.

2. The peak voltmeter according to claim 1 further comprising bias means for maintaining said amplifying device non-conductive to current in the absence of a voltage above a predetermined level at said control terminal.

3. The peak voltmeter according to claim 2 wherein said meter and said current limiting resistor are connected in series between said source of supply voltage and said supply terminal.

4. The combination according to claim 3 wherein said bias means includes said resistive discharge circuit.

5. The combination according to claim 4 wherein said amplifying device comprises a transistor having base, collector and emitter electrodes corresponding respectively to said control, supply and output terminals, and wherein said bias means comprises a second source of supply voltage of opposite polarity to said first mentioned source of supply voltage, a resistor connected in series between said second source of supply voltage and said emitter electrode, and a diode connected between ground and a circuit point between said second source and said resistor, said diode being poled to be conductive to current from said second source.

6. The combination according to claim 5 wherein said means for developing and storing comprises rectifier means for providing rectified singals in response to said AC signals, capacitive circuit means having a short charging time constant and a long discharging time constant relative to said intervals, and means for applying said rectified signals to said capacitive circuit means to develop said peak DC voltage.

7. In a peak reading voltmeter responsive to an AC signal subject to rapid variations of peak value at random intervals, means for rectifying said AC signal to provide a rectified signal, capacitive circuit means having a short charging time constant and a long discharging time constant relative to said intervals connected in receiving relation to the rectified signal to develop a peak DC voltage, a normally cut-off unidirectional amplifier having a control circuit responsive to said peak DC voltage and arranged to increase its current in response to and as a function of the amplitude of said peak DC voltage, a meter circuit comprising a source of supply voltage, a meter, resistance and capacitance all in series, means constraining said current to flow in said meter circuit via said resistance and via said unidirectional amplifier to said capacitance, and a resistive discharge circuit for and connected in parallel with said capacitance for providing a DC current path for said unidirectional amplifier, said resistive discharge circuit and said amplifier having a time constant of the order of said intervals.

8. A voltmeter comprising a transistor having a base, means for applying a voltage to be measured to said base, a meter movement, a storage capacitor, a voltage source of one polarity, means connecting said voltage source of one polarity and said meter movement to said storage capacitor via said transistor, a discharge circuit for said capacitor including a resistance connected to a voltage source of polarity opposite to said one polarity, and means for clamping the voltage of said capacitor to near zero value on the polarity of said last named voltage source.

9. A peak voltmeter for a complex audio wave having a peak value, comprising a storage capacitor, means responsive to said complex audio wave for storing at a relatively rapid rate in said storage capacitor the peak value of said complex audio wave, means for discharging said storage capacitor only slowly to provide memory between peak values of said complex audio wave, a meter circuit responsive to the voltage across said storage capacitor, said meter circuit including a transistor having a base, an emitter and a collector, a meter, means connecting said meter in the collector-emitter path of said transistor, means connecting said storage capacitor in the base circuit of said transistor for establishing a drive signal for said transistor, an accelerating capacitor connected in the emitter circuit of said transistor to provide reduced transient impedance in said emitter circuit during increasing transients in said drive signal of sufficient magnitude to drive said meter off scale if sustained, and a resistance connected across said accelerating capacitor having a value selected to provide range calibration for said meter.

References Cited

UNITED STATES PATENTS

| 1,611,716 | 12/1926 | Brown | 324—103 |
| 2,356,617 | 8/1944 | Rich | 324—125 XR |
| 2,567,688 | 9/1951 | Bigelow | 324—125 XR |

RUDOLPH V. ROLINEC, Primary Examiner

ERNEST F. KARLSEN, Assistant Examiner

U.S. Cl. X.R.

324—111, 125